(12) United States Patent
Boesch

(10) Patent No.: US 8,972,152 B2
(45) Date of Patent: Mar. 3, 2015

(54) METHOD AND SYSTEM FOR INHIBITING ENGINE IDLE STOP BASED ON OPERATING CONDITIONS

(75) Inventor: Mathew Alan Boesch, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 697 days.

(21) Appl. No.: 13/286,946

(22) Filed: Nov. 1, 2011

(65) Prior Publication Data

US 2013/0110374 A1 May 2, 2013

(51) Int. Cl.
*F02N 11/08* (2006.01)
(52) U.S. Cl.
CPC ....... *F02N 11/0837* (2013.01); *F02N 2200/122* (2013.01); *F02N 2200/123* (2013.01); *Y02T 10/48* (2013.01)
USPC .......... 701/112; 701/36; 701/113; 123/179.2; 123/179.4; 123/198 D
(58) Field of Classification Search
CPC . Y02T 10/48; Y02T 10/6221; Y02T 10/6286; Y02T 90/161; B60W 10/06; B60W 10/08; B60W 20/00; B60W 10/30; B60W 2450/28; B60W 2550/12; B60W 2550/402; F02D 41/042; F02D 41/065; F02N 2200/123
USPC .............. 123/179.3–179.4, 339.16; 701/31.5, 701/32.3, 65, 102, 103, 112, 468; 477/97; 165/202; 180/65.28
See application file for complete search history.

(56) References Cited

U.S. PATENT DOCUMENTS

| | | | |
|---|---|---|---|
| 4,903,670 A | 2/1990 | Bauder | |
| 5,150,034 A * | 9/1992 | Kyoukane et al. | 322/10 |
| 5,199,396 A | 4/1993 | Shelef et al. | |
| 5,199,397 A | 4/1993 | Shelef et al. | |
| 5,202,253 A | 4/1993 | Esmon et al. | |
| 6,121,891 A * | 9/2000 | Hwang | 340/561 |
| 6,283,086 B1 * | 9/2001 | Yamamoto et al. | 123/198 D |
| 6,532,926 B1 * | 3/2003 | Kuroda et al. | 123/179.4 |
| 6,675,088 B2 | 1/2004 | Miki | |
| 6,817,330 B1 * | 11/2004 | Ogawa et al. | 123/179.4 |

(Continued)

FOREIGN PATENT DOCUMENTS

| | | | |
|---|---|---|---|
| EP | 1069311 A1 | 1/2001 | |
| EP | 2098392 A1 | 9/2009 | |
| EP | 2169212 A2 | 3/2010 | |

OTHER PUBLICATIONS

Surnilla, Gopichandra et al., "Method and System for Engine Control," U.S. Appl. No. 13/286,959, filed Nov. 1, 2011, 40 pages.

*Primary Examiner* — Erick Solis
*Assistant Examiner* — Carl Staubach
(74) *Attorney, Agent, or Firm* — Julia Voutyras; Alleman Hall McCoy Russell & Tuttle LLP

(57) ABSTRACT

Methods and systems are provided for controlling the automatic shutdown of an idling vehicle engine. When the vehicle is parked in an enclosed space, the idling engine may be automatically shutdown, while when the vehicle is parked in an open space, the automatic shutdown may be delayed based on an ambient temperature. In this way, the vehicle cabin may be maintained at a temperature that provides enhanced driver comfort while allowing wasteful engine idling to be reduced.

10 Claims, 5 Drawing Sheets

(56) References Cited

U.S. PATENT DOCUMENTS

| | | |
|---|---|---|
| 6,817,964 B2 | 11/2004 | Kayukawa et al. |
| 7,548,805 B2 * | 6/2009 | Yamaguchi et al. ............ 701/36 |
| 7,650,864 B2 * | 1/2010 | Hassan et al. .............. 123/179.2 |
| 2002/0157883 A1 | 10/2002 | Ogata et al. |
| 2004/0225419 A1 | 11/2004 | Sakai et al. |
| 2005/0193747 A1 * | 9/2005 | Kajimoto et al. ............... 62/133 |
| 2007/0272187 A1 | 11/2007 | Celisse et al. |
| 2009/0198438 A1 | 8/2009 | Jinno |
| 2010/0138139 A1 * | 6/2010 | Gibert et al. .................. 701/112 |
| 2010/0168992 A1 | 7/2010 | Nakata |
| 2010/0174468 A1 | 7/2010 | Surnilla et al. |
| 2010/0236770 A1 | 9/2010 | Pursifull |
| 2013/0110376 A1 * | 5/2013 | Surnilla et al. ................ 701/103 |

* cited by examiner

METHOD AND SYSTEM FOR INHIBITING ENGINE IDLE STOP BASED ON OPERATING CONDITIONS

FIELD

The present application relates to methods and systems for controlling the shutdown of an idling vehicle engine.

BACKGROUND AND SUMMARY

In recent years, vehicles have been configured with new driver ignition interfaces to ease vehicle operation. For example, previous key-based interfaces have been replaced with keyless or smart-key interfaces. While previous key-based interfaces would require the operator to start or stop the engine by inserting or removing a key (e.g. an active key) from the ignition system, newer interfaces may allow the engine to be started or shutdown by pressing a start/stop button and/or based on the presence of a passive key (e.g., a smart key or electronic key fob) within a predetermined distance of the vehicle.

In the absence of a physical apparatus (e.g., an active key) that needs to be inserted/removed into the ignition system to start/stop the engine, a vehicle operator may unintentionally leave the vehicle with the engine idling. Recent advances in engine technology that have made vehicle engines quieter further increase the likelihood that a vehicle operator may leave the vehicle with the engine running. To address this issue, vehicle control systems may be configured to automatically shutdown an idling engine, for example, upon the elapse of a specified duration of idling time.

However, the inventors herein have identified potential issues in vehicles with such keyless interfaces. As an example, a vehicle operator may temporarily step out of the vehicle and intentionally leave the engine idling so as to maintain a desired cabin condition and ensure driving comfort upon return to the vehicle. This may be particularly important during inclement weather conditions. If the idling engine is prematurely stopped by the vehicle control system, the desired cabin condition may not be attained and the operator's drive feel may be degraded upon return to the vehicle.

In one example, the above issue may be at least partly addressed by a method of controlling a vehicle at standstill or stop. In one embodiment, the method comprises automatically inhibiting a shutdown of an idling engine based on each of a location of the vehicle and an ambient temperature condition. In this way, the automatic shutdown of an idling engine can be overridden during selected conditions, such as during cold weather conditions when the vehicle is parked outdoors.

In one example, a vehicle operator may have intentionally left a vehicle at standstill with the engine running. That is, the vehicle may be temporarily parked with the engine idling so as to warm the engine and the vehicle. A vehicle control system may use one or more of location sensors, on-board navigation equipment, temperature sensors, humidity sensors, oxygen sensors, etc., to determine the location of the vehicle, and to further determine whether the vehicle is located in a substantially enclosed space or an open space. For example, a controller may determine whether the vehicle is parked in a substantially enclosed space or an open space based on a change in an ambient condition (e.g., temperature or humidity), as estimated over a duration while the vehicle is at standstill. In response to the vehicle being parked in an open space, such as in an open parking lot, the vehicle control system may delay the automatic shutdown of the idling engine in anticipation of the operator returning to the vehicle imminently. The amount of delay may be based on environmental conditions, such as an ambient temperature of the location. For example, during cold weather conditions, the amount of delay may be increased to maintain a warm cabin temperature inside the vehicle or heat an emissions control device such as a catalyst. In comparison, in response to the vehicle being parked in a substantially enclosed space, such as an indoor garage, the vehicle control system may automatically shutdown the idling engine in anticipation of the operator not returning to the vehicle imminently.

In this way, by adjusting the shutdown of an idling vehicle engine based on the geographical location and environmental conditions of the vehicle, enhanced driver comfort can be provided, thereby improving the quality of the operator's drive feel. In addition, vehicle emissions and wasteful fuel consumption may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
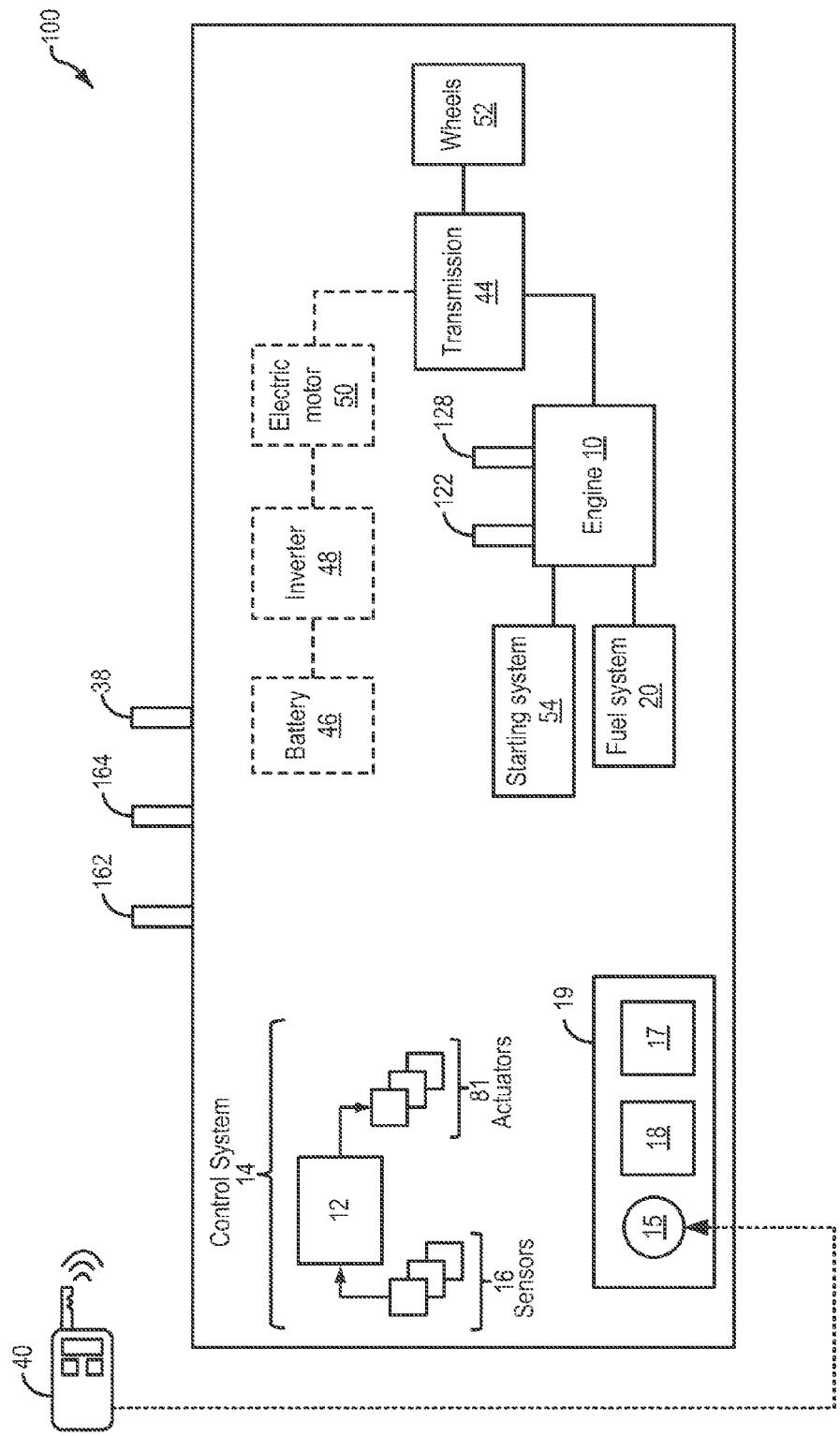
FIG. 1 illustrates an example vehicle system.
Figure 2:
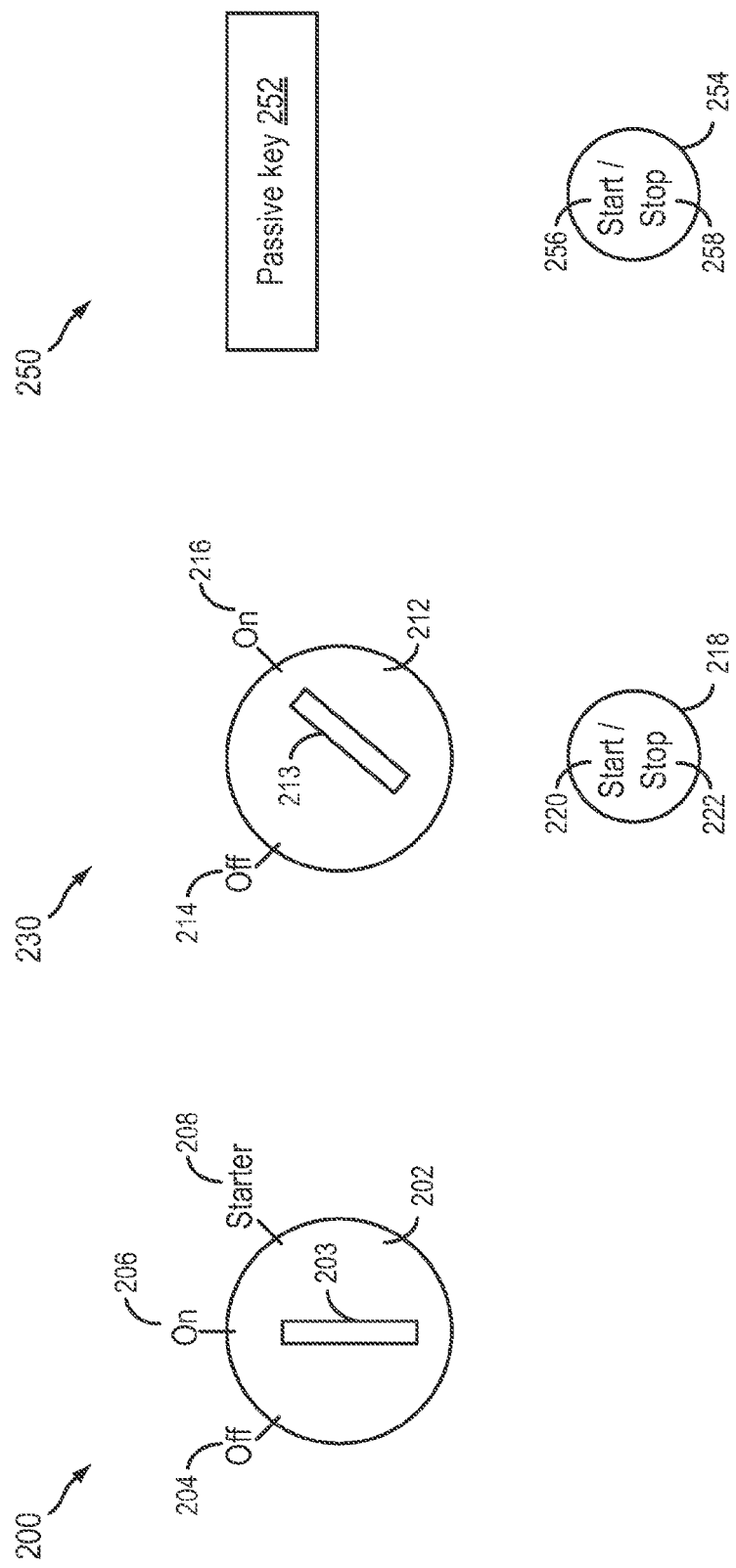
FIG. 2 illustrates example ignition interfaces that may be included in the vehicle system of FIG. 1.
Figure 3:
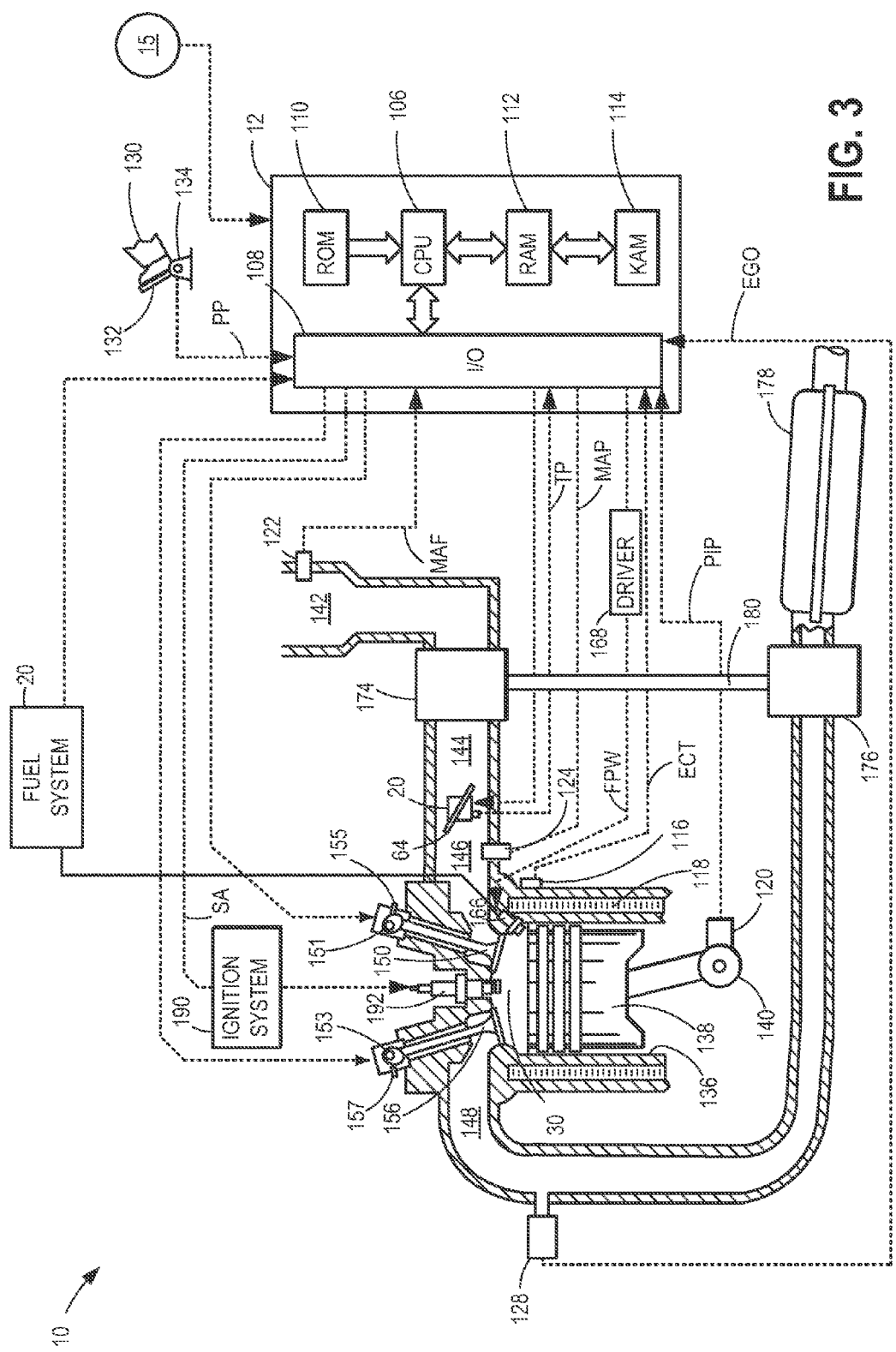
FIG. 3 illustrates an example embodiment of an internal combustion engine.

The following description relates to systems and methods for operating a vehicle having an ignition interface that is keyless or operated with a passive key, such as shown in the vehicle system of FIGS. 1-3. During conditions when a vehicle operator has left the vehicle at standstill with the engine idling, an automatic shutdown of the idling engine may be adjusted based on the location where the vehicle is parked and further based on the ambient conditions (e.g., temperature) of the location. An engine controller may be configured to perform a control routine, such as the routine of FIG. 4, to automatically shutdown the idling engine when the vehicle is parked in an enclosed space, such as an indoor parking lot. In comparison, when the vehicle is parked in an open space, such as an outdoor parking lot, and the outdoor conditions are inclement, the automatic shutdown may be delayed to provide a desired cabin temperature to the vehicle operator upon return to the vehicle. The controller may infer that the vehicle location is an enclosed space or open space (FIG. 5) based on changes in an ambient condition (e.g., change in temperature or humidity) or an engine operating condition (e.g., change in a commanded exhaust air-to-fuel ratio) over a duration while the operator is away from the vehicle. Alternatively, the location may be inferred from vehicle location sensors and navigation systems. In this way, by adjusting the automatic shutdown of the idling engine based on the location and the ambient temperature, driver comfort may be improved while reducing exhaust emissions and fuel wastage.

FIG. 1 depicts a vehicle system 100 including an internal combustion engine 10 coupled to transmission 44. Engine 10 may be started with an engine starting system 54, including a starter motor. Transmission 44 may be a manual transmission, automatic transmission, or combinations thereof. Transmission 44 may include various components such as a torque converter, a final drive unit, a gear set having a plurality of gears, etc. Transmission 44 is shown coupled to drive wheels 52, which may contact a road surface.

In one embodiment, vehicle system 100 may be a hybrid vehicle wherein transmission 44 may alternatively be driven by an electric motor 50. For example, the motor may be a battery-powered electric motor (as depicted) wherein electric motor 50 is powered by energy stored in battery 46. Other energy storage devices that may be used to power motor 50 include a capacitor, a flywheel, a pressure vessel, etc. An energy conversion device, herein inverter 48, may be configured to convert the DC output of battery 46 into an AC output for use by electric motor 50. Electric motor 50 may also be operated in a regenerative mode, that is, as a generator, to absorb energy from vehicle motion and/or the engine and convert the absorbed energy to an energy form suitable for storage in battery 46. Furthermore, electric motor 50 may be operated as a motor or generator, as required, to augment or absorb torque during a transition of engine 10 between different combustion modes (e.g., during transitions between a spark ignition mode and a compression ignition mode).

When configured in the hybrid embodiment, vehicle system 100 may be operated in various modes wherein the vehicle is driven by only the engine, only the electric motor, or a combination of both. Alternatively, assist or mild hybrid modes may also be employed, wherein the engine is the primary source of torque, and the electric motor selectively adds torque during specific conditions, such as during a tip-in event. For example, during an "engine-on" mode, engine 10 may be operated and used as the primary source of torque for powering wheels 52. During the "engine-on" mode, fuel may be supplied to engine 10 from fuel system 20 including a fuel tank. The fuel tank may hold a plurality of fuels, such as gasoline, or fuel blends, such as fuel with a range of alcohol (e.g., ethanol) concentrations including E10, E85, etc., and combinations thereof. In another example, during an "engine-off" mode, electric motor 50 may be operated to power the wheels. The "engine-off" mode may be employed during braking, low speeds, while stopped at traffic lights, etc. In still another example, during an "assist" mode, an alternate torque source may supplement and act in cooperation with the torque provided by engine 10.

Vehicle system 100 may further include control system 14. Control system 14 is shown receiving information from a plurality of sensors 16 (various examples of which are described herein) and sending control signals to a plurality of actuators 81 (various examples of which are described herein). The control system 14 may further include a controller 12. The controller may receive input data from the various sensors or buttons, process the input data, and trigger the actuators in response to the processed input data based on instruction or code programmed therein corresponding to one or more routines. Example control routines are described herein with regard to FIGS. 4-5.

As one example, sensors 16 may include various pressure, temperature, and humidity sensors. For example, vehicle system 100 may include temperature sensor 162 located on an exterior surface of the vehicle, or within an air intake system in communication with air outside of the vehicle, for estimating an ambient air temperature. The vehicle system may further include one or more temperature sensors located inside the vehicle for estimating a temperature inside the vehicle's cabin space. A vehicle operator may provide input regarding a desired cabin temperature via an operator interactive device 18 (e.g., a button, knob, or touch-screen) configured on a vehicle dashboard 19. Based on the cabin temperature setting selected by the operator in relation to the estimated ambient temperature, a vehicle HVAC system (not shown) may be operated to heat or cool the cabin and provide the requested degree of cabin comfort. Vehicle system 100 may further include a humidity sensor 164 located on the exterior surface of the vehicle, or within an air intake system in communication with air outside of the vehicle, for estimating an ambient humidity. Still other sensors communicating with control system 14 may include a fuel level sensor coupled to fuel system 20, manifold air flow sensor 122, and an exhaust gas sensor 128 (e.g., an exhaust gas oxygen sensor), as further elaborated in FIG. 3.

Vehicle system 100 may also include an on-board navigation system 17 (for example, a Global Positioning System) on dashboard 19 that the operator can interact with. The navigation system may include one or more location sensors for assisting in estimating a location (e.g., geographical coordinates) of the vehicle. In one example, the navigation system, and the one or more location sensors, may be configured to infer whether the vehicle is parked in an enclosed space, such as an indoor parking lot, or an open space, such as an outdoor parking lot or open air parking structure. For example, the navigation system may place the vehicle within a parking structure using at least dead reckoning methods and further consult additional map information to determine whether the parking structure is in an open space or an enclosed space. In another example, an open space may be inferred based on the presence of an unobstructed view, or open view, of the sky at the location of the vehicle. In contrast, an enclosed space may be inferred based on the presence of an obstructed view (or the absence of the open view) of the sky at the location of the vehicle.

Dashboard 19 may further include an operator ignition interface 15 via which the vehicle operator may adjust the ignition status of the vehicle engine. Specifically, the operator ignition interface may be configured to initiate and/or terminate operation of the vehicle engine based on an operator input. Various embodiments of the operator ignition interface are described herein with reference to FIG. 2. The various embodiments may include interfaces that require a physical apparatus, such as an active key, that has to be inserted into the operator ignition interface to start the engine and turn on the vehicle, or be removed to shutdown the engine and turn off vehicle. Other embodiments may include a passive key 40 that is communicatively coupled to the operator ignition interface. The passive key may be configured as an electronic key fob or a smart key that does not have to be inserted or removed from the ignition interface to operate the vehicle engine. Rather, the passive key may need to be located inside or proximate to the vehicle (e.g., within a threshold distance of the vehicle). Still other embodiments may additionally or optionally use a start/stop button that is manually pressed by the operator to start or shutdown the engine and turn the vehicle on or off. Based on the configuration of the operator ignition interface, a vehicle operator may provide an indication as to whether the engine is in an engine-on or engine-off condition, and further whether the vehicle is in a vehicle-on or vehicle-off condition.

Controller 12 may also receive an indication of the ignition status of engine 10 from an ignition sensor (not shown) coupled to the operator ignition interface. Controller 12 may also communicate directly with engine 10 regarding the on/off status of the engine. Vehicle 100 may further include a key fob sensor 38 configured to receive input from passive key 40. Specifically, key fob sensor 38 may remotely couple the vehicle 100 to passive key 40, thereby enabling a remote keyless entry into vehicle 100 and/or a remote keyless operation of vehicle engine 10. During conditions where the vehicle operator leaves the vehicle unoccupied (with the passive key remaining in the possession of the operator), key fob sensor 38 may also be configured to provide an indication to controller 12 regarding the proximity of the vehicle operator from the vehicle. Based on the proximity of the vehicle operator from the vehicle, an automatic shutdown of an idling engine may be optionally adjusted, as elaborated in FIG. 4.

Control system 14 may be configured to send control signals to the actuators 81 based on input received from the sensors and the vehicle operator. The various actuators may include, for example, cylinder fuel injectors, an air intake throttle coupled to the engine intake manifold, a spark plug, etc. (as further elaborated in FIG. 3).

Now turning to FIG. 2, various embodiments of an operator ignition interface are shown (such as the operator ignition interface 15 of the vehicle system of FIG. 1). In each of the depicted embodiments, an engine-on condition is indicated to controller 12 based on the position of a slot in the vehicle's keyhole, the presence or absence of a passive key in the vehicle, and/or the position of a vehicle ignition start/stop button. A related position sensor (not shown) may communicate the respective positions to the controller. The depicted example embodiments of an engine-on configuration may be found in hybrid-drive enabled vehicle systems (as shown in FIG. 1), non-hybrid enabled vehicle systems, and/or push-button engine start-enabled vehicle systems. It should also be appreciated that engine-on conditions are not one-to-one equivalent to vehicle-on conditions. For example, engine-on conditions can occur under both vehicle-on and vehicle-off conditions.

A first example embodiment of an operator ignition interface in an engine-on condition is shown at 200. Herein, an engine keyhole 202 may include a slot 203. By inserting a physical apparatus, such as an active key, the position of the slot 203 may be varied between a first position 204 corresponding to a vehicle-off condition, a second position 206 corresponding to a vehicle-on (and engine-on) condition, and a third position 208 corresponding to a starter-on (or engine-on) condition. As such, to start cranking the engine, a vehicle key may be inserted in the keyhole 202 and slot 203 may be initially positioned at the third position 208 to start operating the engine starter. Following engine start, the slot may be returned to the second position 206 to signal that the engine is running. After running the engine, the vehicle may be turned off by moving the slot 203 to the first position 204. As such, a vehicle-off condition may be communicated to the controller by the presence of slot 203 in the first position 204, irrespective of whether the key is in the slot or pulled out of the slot.

A second example embodiment of an operator ignition interface in an engine-on condition is shown at 230. Herein, an engine keyhole 212 may include a slot 213. By inserting a physical apparatus, such as an active key, the position of the slot 213 may be varied between a first position 214 corresponding to a vehicle-off condition, and a second position 216 corresponding to a vehicle-on condition. An additional button 218 may be provided that may be alternated between a start position 220 and a stop position 222 to accordingly start or stop the engine. As such, to start cranking the engine, a vehicle key may be inserted in the keyhole 212, slot 213 may be positioned at the second position 216, and button 218 may be pushed into start position 220 to start operating the engine. The engine may be stopped by pushing button 218 into stop position 222. Following engine-off, a vehicle-off condition may be achieved by moving the slot 213 to the first position 214. As such, the vehicle-off condition may be communicated to the controller by the presence of slot 213 in the first position 214, irrespective of whether the key is in the slot or pulled out of the slot.

A third example embodiment of an operator ignition interface in an engine-on condition is shown at 250. Herein, in place of an engine keyhole and a physical apparatus such as an active key that has to be inserted in the keyhole, a passive key 252 (such as a smart key or an electronic key fob) may be used to indicate the presence of a driver in the vehicle to the controller. Specifically, when passive key 252 is inside the vehicle, or within a threshold distance of the vehicle (for example, as sensed by a key fob sensor communicatively coupled to an electronic key fob), a vehicle-on condition may be confirmed. An additional button 254 may be provided that may be alternated between a start position 256 and a stop position 258 to accordingly start or stop the engine, but may be actuated only when the passive key is inside (or within a threshold distance of) the vehicle. To start running the engine, the passive key may be present inside, or within a threshold distance of the vehicle, and button 254 may be pushed into start position 256. A vehicle-off (and also engine-off) condition may be indicated by the presence of passive key 252 inside the vehicle and the presence of button 254 at stop position 258. Alternatively, a vehicle-off condition may be indicated by the absence of the passive key from the inside of the vehicle (or presence of the passive key beyond a threshold distance of the vehicle).

In one example, the vehicle operator may have turned on the engine by pressing button 254 and thereafter may have parked the vehicle. While the vehicle is at standstill with the engine running, the vehicle operator may step out of the vehicle, for example, with passive key 252. The vehicle may be unoccupied for the duration of the standstill with the operator proximity being greater than a threshold, in one example. During this engine-on condition, the vehicle control system (or an engine control module of the vehicle control system) may be configured to either automatically shutdown the idling engine, or extend an idle time before the automatic shutdown of the idling engine, based at least on an ambient temperature estimated over the duration of the standstill. The control system may be further configured to infer whether the vehicle is located in an enclosed space or an open space (e.g., based on the output of one or more a temperature sensor estimating an ambient temperature, a humidity sensor estimating an ambient humidity, an oxygen sensor estimating a commanded air-to-fuel ratio or mass ratio, a location sensor, an on-board navigating system, etc.) and automatically shutdown the idling engine based on the inference. Specifically, as elaborated in FIG. 4, the control system may automatically shutdown the idling engine when the vehicle is located in an enclosed space while extending an idle time before automatically shutting down the engine when the vehicle is located in an open space.

FIG. 3 depicts an example embodiment of a combustion chamber or cylinder of engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. As another example, input regarding a vehicle-on and/or engine-on condition may be received via driver ignition interface 15, as previously discussed with reference to FIGS. 1-2. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 3 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 64 may be provided along an intake passage of the engine for varying the flow rate and/or pressure of intake air provided to the engine cylinders. For example, throttle 20 may be disposed downstream of compressor 174 as shown in FIG. 3, or alternatively may be provided upstream of compressor 174.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock or pre-ignition suppressing fluid thereto. In some embodiments, the fluid may be a fuel, wherein the injector is also referred to as a fuel injector. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel may be delivered to fuel injector 166 from a high pressure fuel system 20 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 3 shows only one cylinder of a multi-cylinder engine. As such each cylinder may similarly include its own set of intake/exhaust valves, fuel injector(s), spark plug, etc.

Fuel tanks in fuel system 20 may hold fuel with different qualities, such as different compositions. These differences may include different alcohol content, different octane, different heat of vaporizations, different fuel blends, and/or combinations thereof etc. In one example, fuels with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc.

Controller 12 is shown in FIG. 3 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor. Engine speed signal, RPM, may be generated by controller 12 from signal PIP. Manifold pressure signal MAP from a manifold pressure sensor may be used to provide an indication of vacuum, or pressure, in the intake manifold. The controller may also receive operator input and indication regarding the ignition status of the engine from an operator ignition interface 15.

Storage medium read-only memory 110 can be programmed with computer readable data representing instructions executable by processor 106 for performing the methods described below as well as other variants that are anticipated but not specifically listed. Example routines are described herein with reference to FIGS. 4-5.

Figure 4:
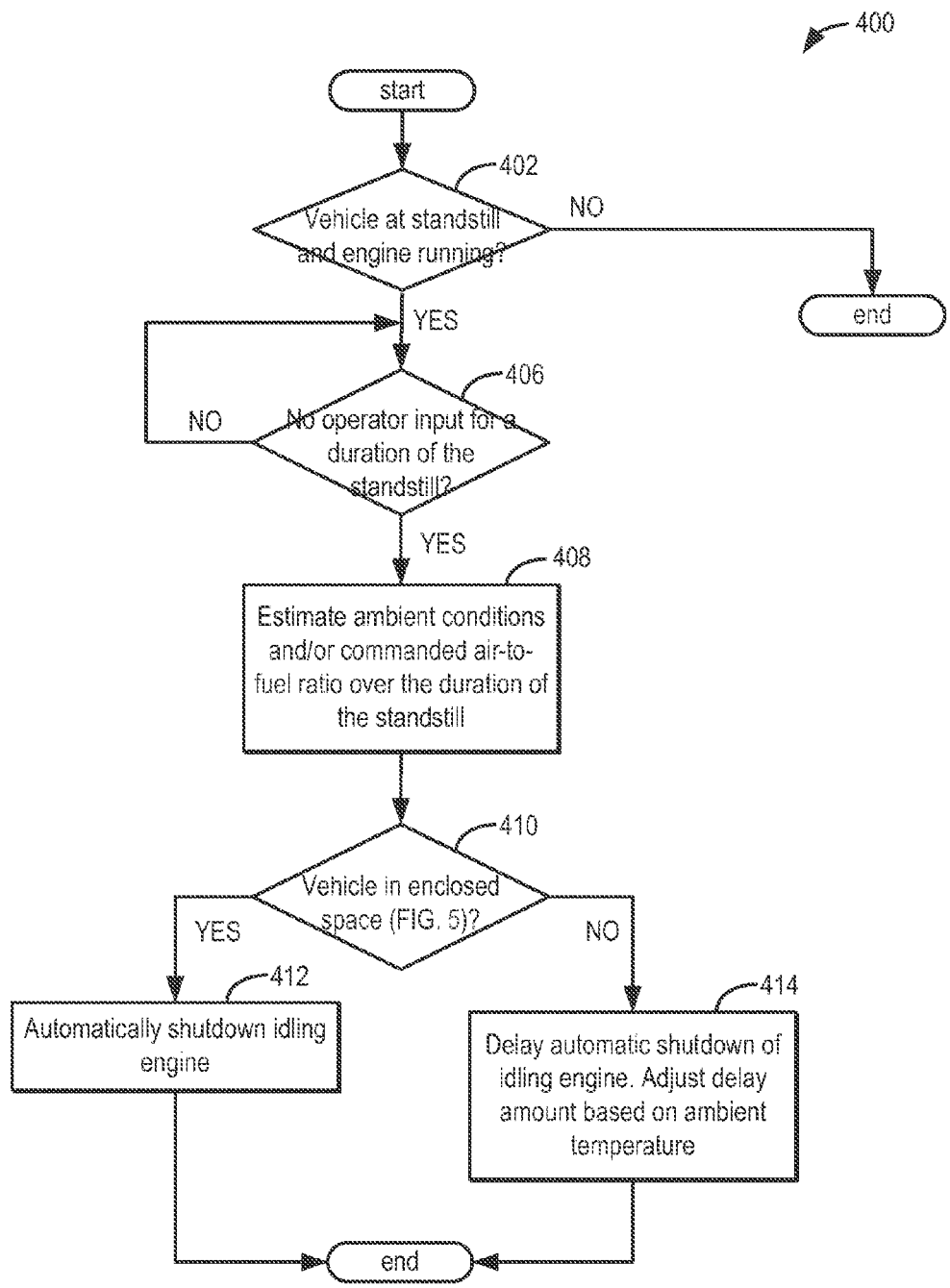
FIG. 4 illustrates a high level flow chart for adjusting the shutdown of an idling engine based on the location and environmental condition of a parked vehicle.

Now turning to FIG. 4, an example routine 400 is shown for adjusting the automatic shutdown of an idling engine in a vehicle at standstill based on each of a location of the vehicle and an ambient condition (for example, an ambient temperature) of the location. In this way, wasteful engine idling can be limited when the vehicle is parked indoors and an imminent vehicle operation is not anticipated, while allowing the engine to continue idling to provide a desired cabin condition when the vehicle is parked outdoors and an imminent vehicle operation is anticipated.

At 402, it may be confirmed that the vehicle is at standstill with the engine running. For example, it may be confirmed via the operator ignition interface that the engine is turned on (e.g., a keyhole slot is in the on position and/or a start/stop button is in the start position) and is running at an idle speed while the vehicle is at standstill. In one example, the vehicle may be unoccupied and optionally a proximity of the driver from the vehicle may be determined. For example, the vehicle operator may possess a passive key (e.g., smart key or electronic key fob) for operating the vehicle, and the proximity of the operator to the vehicle (e.g., whether the vehicle operator is within a threshold distance of the vehicle or beyond the threshold distance) may be determined by a position of the passive key, as sensed by a communicatively coupled fob sensor. In an alternate example, the vehicle operator may be in the vehicle while the vehicle is at standstill.

At 406, it may be confirmed that no operator input has been received for a duration of the standstill. For example, if the vehicle is unoccupied, it may be confirmed that while the vehicle is at standstill and the operator is away from the vehicle, the operator has not used the passive key to remotely turn the engine (and/or vehicle) off. In an alternate example, if the vehicle is occupied, it may be confirmed that the vehicle operator has not pressed the accelerator and/or brake pedals while the vehicle is at standstill.

Upon confirmation that no operator input has been received, at 410, ambient operating conditions and/or a commanded engine air-to-fuel ratio may be estimated over the duration of the standstill. In one example, the duration may be a duration when the operator is away from the vehicle, for example, at greater than a threshold distance from the vehicle. Alternatively, the duration may be a duration when the operator is within the vehicle but has not provided any operator input. For example, the operator may have fallen asleep inside the vehicle at standstill.

In one example, the estimated ambient conditions may include an absolute ambient temperature estimated over a duration of the standstill. In another example, a change in ambient temperature may be measured over the duration. In still another example, an ambient humidity may be estimated over the duration. In still a further example, a commanded air-to-fuel ratio, or mass ratio of measured air flow to measured fuel flow, may be estimated.

At 412, based on the estimated ambient operating conditions, it may be determined whether the vehicle is located in an enclosed space. An enclosed space may include, for example, an indoor parking structure, while a non-enclosed space (or open space) may include, for example, an outdoor (or open air) parking structure. As elaborated herein with reference to FIG. 5, an engine controller may be configured to infer whether the vehicle is located in an enclosed space or an open space based on input from one or more vehicle location sensors, an on-board vehicle navigation system, a change in ambient temperature over the selected duration of the standstill, a change in ambient humidity over the selected duration, a change in commanded air-to-fuel ratio over the selected duration, or a combination thereof.

For example, the controller may automatically shutdown the idling engine in response to an increase in the ambient temperature being higher than a threshold over the duration while the vehicle is at standstill in the enclosed space. Herein, the increase in ambient temperature may indicate that the vehicle is in an enclosed space. In an alternate example, the controller may automatically shutdown the idling engine in response to the ambient temperature remaining higher than a threshold over the duration while the vehicle is at standstill in the enclosed space. Herein, the higher ambient temperature condition may indicate a reduced need for cabin heating. In the absence of a need to operate a vehicle HVAC system, the idling engine of the vehicle at standstill may be shutdown.

If the vehicle is located in an enclosed space, for example, an indoor parking location, then at 412, the routine includes automatically shutting down the idling engine, for example, after a preselected idle duration or substantially immediately. In one embodiment, if the vehicle is located in the enclosed space, the idling engine may be automatically shutdown irrespective of whether the vehicle is occupied or unoccupied, and irrespective of the proximity of the vehicle operator to the vehicle (when unoccupied). However in an alternate embodiment, if the vehicle is located in the enclosed space, an idle time before the automatic shutdown of the idling engine may be based on whether the vehicle is occupied or unoccupied, and further based on a proximity of the vehicle operator to the vehicle. For example, the idle time may be reduced as the distance of the vehicle operator from the vehicle increases when the vehicle is in the enclosed space. In still another example, the idle time before the automatic shutdown may be further based on a battery state of charge. For example, if the battery state of charge is lower than a threshold state of charge, the idle time may be extended before shutting down to allow the battery to be brought to the threshold state of charge (e.g., 30% SOC), so as to reduce the likelihood of an automatic engine restart immediately following the automatic shutdown.

If the vehicle is not in an enclosed space, then at 414, the routine includes inhibiting the automatic shutdown of the idling engine based on the vehicle being located in an open space, such as an outdoor parking location or open air parking structure. The inhibiting may include delaying the shutdown of the idling engine and extending the idle time before the automatic shutdown based on an ambient condition, such as an ambient temperature of the location. For example, the routine may include increasing an amount of delay as the ambient temperature falls below a threshold temperature while the vehicle is at standstill in a non-enclosed space. Herein, by extending the idling time in response to the ambient temperature being lower than a threshold, that is, in response to cold ambient conditions, the engine may be kept running to operate a vehicle HVAC system and provide cabin heating. Consequently, a desired level of cabin comfort may be provided to the vehicle operator upon return to the vehicle.

In another example, the delaying may be based on a change in the ambient temperature over the duration while the vehicle is at standstill in the non-enclosed space. For example, the vehicle may be parked in a location where the ambient temperature is high (e.g., in texas when the ambient temperature is 105 degF) and it may be desirable to continue idling the engine in support of air-conditioning (for example, due to the driver leaving a pet or passengers in the vehicle). Herein, the ambient temperature sensed may not be expected to be rapidly increasing from a starting point but delaying of the shutdown may still be desired.

Figure 5:
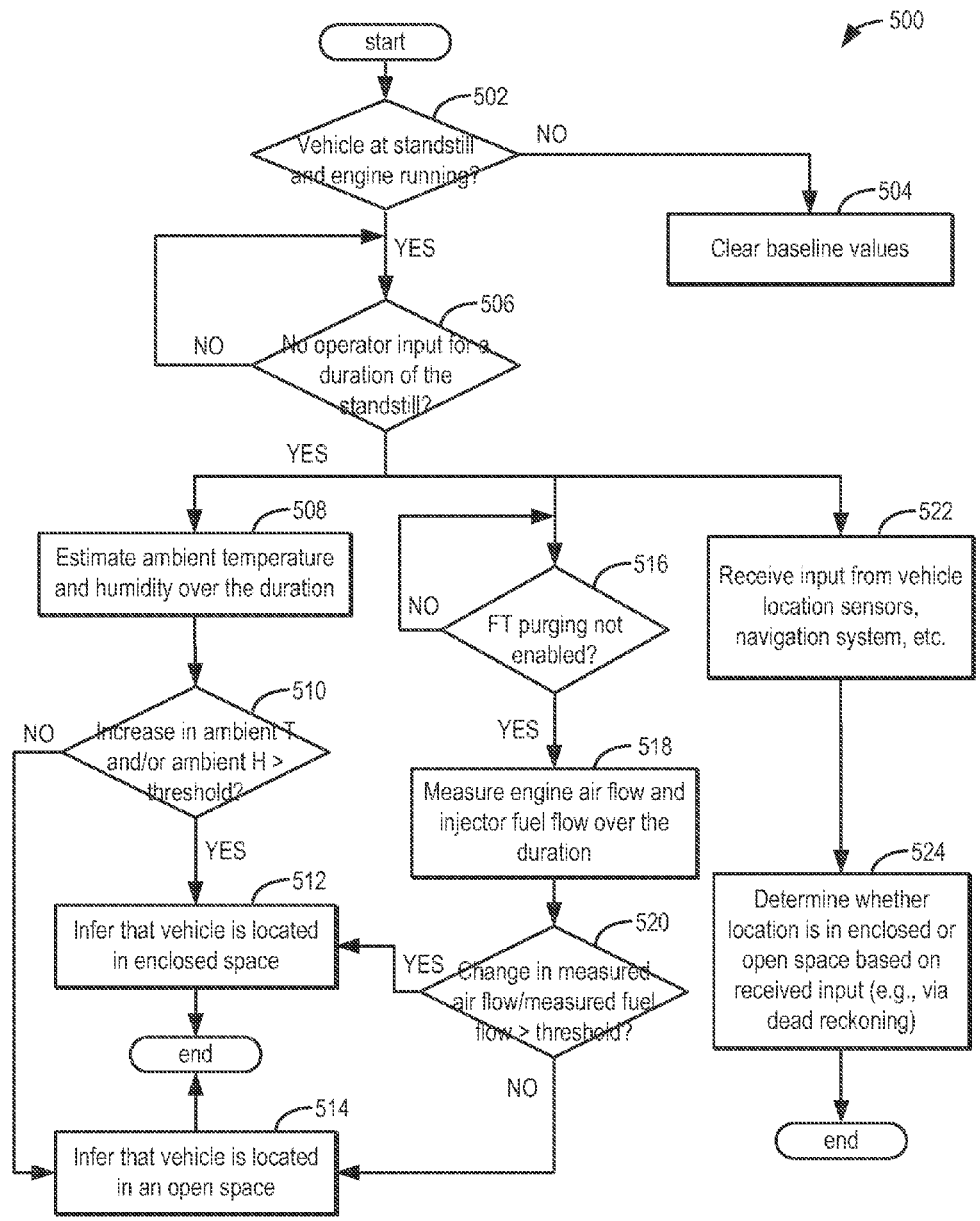
FIG. 5 illustrates a high level flow chart for determining the location of a vehicle at standstill based on the output of one or more vehicle sensors.

Now turning to FIG. 5, an example routine 500 is shown for inferring a location of a vehicle at standstill (e.g., whether the vehicle is located in an enclosed space or an open space) based on ambient operating conditions and/or based on a commanded air to fuel ratio (or mass ratio). Specifically, the location may be based on at least one of a change in ambient temperature, a change in ambient humidity, and a change in the mass of an air flow relative to a fuel flow to an injector (herein also referred to as a commanded air-to-fuel ratio) as estimated over a duration of the standstill. As elaborated in FIG. 4, a controller may be configured to automatically shutdown an idling vehicle engine, of a vehicle at standstill, in responsive to the location (e.g., open space or enclosed space location) of the vehicle.

At 502, (as at 402 of FIG. 4) it may be confirmed that the vehicle is at standstill and the engine is running. If not, baseline values of estimated ambient operating conditions (e.g., ambient temperature and humidity) may be cleared. At 504, (as at 406 of FIG. 4) it may be confirmed that no operator input has been received for a duration of the standstill. Upon confirmation, the location of the vehicle may be inferred based on one or more of an estimated ambient temperature and/or humidity (as elaborated at 508-514), a commanded air-to-fuel ratio, or mass ratio (as elaborated at 516-520), and a navigation system and one or more location sensors (as elaborated at 522-524).

A first approach for inferring the location of the vehicle based on an estimated ambient temperature and humidity is now discussed. At 508, an ambient temperature and/or an ambient humidity is estimated over a duration of the standstill. The ambient temperature may be estimated by a temperature sensor coupled to an exterior of the vehicle or a sensor coupled to an air intake system of the vehicle in communication with air outside the vehicle. Likewise, the ambient humidity may be estimated by a humidity sensor coupled to the exterior of the vehicle or a sensor coupled to an air intake system of the vehicle in communication with air outside the vehicle. Alternatively, the ambient air temperature may be inferred from other vehicle operating parameters. At 510, it may be determined if there is an increase in the estimated temperature and/or humidity over the duration, and if the increase is higher than a threshold. If yes, then at 512, the routine includes inferring the location is an enclosed space in response to at least one of an increase in the estimated ambient temperature and an increase in the ambient humidity being greater than the threshold. If not, then at 514, the routine includes inferring the location is an open space based on at least one of an increase in the estimated ambient temperature and an increase in the ambient humidity being lower than the threshold.

A second approach for inferring the location of the vehicle based on a change in a commanded air-to-fuel ratio is now discussed. As such, the commanded air-to-fuel ratio may be estimated by monitoring changes in a manifold air flow relative to changes in an injector fuel flow in a closed loop operation while holding an exhaust air-to-fuel ratio (for example, as estimated by an EGO sensor) at stoichiometry. In this way, if the oxygen content of engine intake air is reduced (e.g., due to displacement of ambient oxygen by exhaust gas), the mass airflow sensor (or the manifold absolute pressure sensor) will not identify the difference in the intake air oxygen concentration (e.g., as the hot wire anemometer in the MAF will measure the same mass flow whether or not the oxygen concentration has changed). As such, the commanded fuel will be adjusted (e.g., decreased) based on feedback from the exhaust gas sensor due to the reduced oxygen, and the controller can observe an increase in the ratio of measured airflow to measured fuel flow (due to the decrease in injected fuel as caused by the feedback form the exhaust sensor in order to maintain stoichiometry in the exhaust) and thus can identify the enclosed space. This is in contrast to the variation caused by changes (e.g., reductions) in engine friction (but with the ambient oxygen concentration unchanged) in that the measured ratio of airflow (e.g., from the MAF) to injected fuel flow, while maintaining stoichiometry in the exhaust, will be relatively unchanged.

At 516, it may be confirmed that purging conditions are not present and that purging of fuel vapors from the fuel tank is not enabled. Upon confirmation, at 518, a manifold air flow and an injector fuel flow may be measured and/or estimated over the duration of the standstill. The manifold air flow may be measured by a manifold air flow sensor (such as MAF sensor 122 of FIG. 3), a manifold pressure sensor (such as MAP sensor 124 of FIG. 3) or a combination thereof. The injector fuel flow may be estimated based on, for example, a fuel pulse width.

At 520, it may be determined if there is an increase in the commanded closed loop air-to-fuel ratio over the duration, and if the increase in the commanded air-to-fuel ratio is higher than a threshold. In particular, it may be determined whether a change in the measured air flow relative to the measured fuel flow, during closed loop operation, is higher than a threshold (while maintaining the exhaust air-to-fuel ratio at stoichiometry). As such, in an enclosed space, the amount of oxygen available for combustion may progressively decrease making the air-to-fuel ratio appear richer. To compensate for the lower fraction of oxygen in the air mass, the manifold air flow may be increased by an engine controller. Thus, in response to an increase in the commanded air-to-fuel ratio (or mass ratio) being higher than a threshold change, an enclosed space may be inferred at 512. In comparison, in response to an increase in the commanded air-to-fuel ratio (or mass ratio) being lower than the threshold change, an open space may be inferred at 514. By measuring both the manifold air flow as well as the fuel flow, and determining the location of the vehicle based on each of the measured parameters, a change in air flow resulting from an increase in friction (e.g., during a cold start or due to AC compressor operation) may be better distinguished from a change in air flow resulting from a decrease in the ambient oxygen concentration. Consequently, a false positive determination of an enclosed space (due to the change in only the air flow) may be reduced.

In this way, an engine controller may automatically shut down an engine in response to a comparison of measured airflow to measured fuel flow during idling operation, including shutting down the engine as fuel flow for a given measured airflow decreases (e.g., decreases past a threshold) while maintaining stoichiometry in the engine exhaust.

A third approach for inferring the location of the vehicle based on input from a navigation system and/or location sensors is now discussed. At 522, input is received from one or more of a location sensor of the vehicle, an on-board navigation system of the vehicle, and a mobile navigation system coupled to an engine control module of the vehicle. For example, the mobile navigation system may be configured on a mobile device (e.g., cellular phone or portable GPS) carried by the operator that is communicatively coupled, or synchronized, to an engine control module of the vehicle control system. In still another example, input may be received in the form of a broadcast signal, such as a broadcast radio signal. The broadcast signal may be transmitted by the location where the vehicle is situated (e.g., via a transmitter of the indoor/outdoor parking garage) and may specifically indicate the location and the enclosed/open environment of the location. At 524, based on the received input, it may be inferred whether the vehicle is in an enclosed space or an open space. In one example, the navigation system may determined the location of the vehicle by dead reckoning. For example, the navigation system may place the vehicle in a parking structure by dead reckoning and may further consult additional map information to determine whether the parking structure is in an open space or an enclosed space. For example, if the location is an outdoor parking lot or open air parking structure, it may be determined that the vehicle is in an open space. In another example, if the location is an indoor parking lot, it may be determined that the vehicle is in an enclosed space.

In another embodiment, wherein the vehicle is unoccupied with the vehicle operator possessing a passive key for operating the vehicle, the passive key communicatively coupled to the vehicle by a sensor, the location of the vehicle may be inferred based on a proximity of the operator to the vehicle as determined by a position of the passive key. As such, in each case, in response to the location being an enclosed space, an engine controller may automatically shut down the idling vehicle engine, while in response to the location being an open space, the controller may extend an idle time before automatically shutting down the idling vehicle engine.

In one example, during a first engine idling condition, a controller may be configured to shutdown the engine in response to the vehicle being located in an enclosed space. Herein, during the first condition, the vehicle may be parked in an indoor parking location. In another example, during a second engine idling condition, the controller may be configured to delay the engine shutdown in response to the vehicle being located in an open space, the delay adjusted based on an ambient temperature of the open space. Herein, during the second condition, the vehicle may be parked in an outdoor parking location. The adjustment may include, increasing the delay as the ambient temperature of the open space falls below a threshold temperature. The ambient temperature may be estimated over a duration of the standstill by a temperature sensor communicatively coupled to ambient air exterior to the vehicle. As such, during each of the first and second engine idling conditions, the vehicle may be parked and unoccupied, for example, the vehicle operator may be located beyond a threshold distance of the vehicle. The vehicle being located in the enclosed space or the open space may be based on input from one or more of a navigation system (e.g., on-board the vehicle or communicatively coupled to the vehicle), a location sensor, a broadcast signal, a temperature sensor, a humidity sensor, an air-to-fuel ratio sensor, and other sensors of the vehicle.

In this way, a vehicle including an engine may be controlled when the vehicle is at standstill with the engine idling. For example, if the vehicle operator has left the vehicle with the engine inadvertently running, the idling engine can be shutdown. By automatically shutting down the engine and reducing the idling time when the vehicle is in an enclosed space, fuel wastage and exhaust emissions can be reduced while also reducing degradation of the air quality of the enclosed space. However, if the vehicle operator has left the engine with the engine running intentionally, the idling time can be extended to provide the desired level of cabin comfort, in particular during cold ambient conditions. In this way, the drive quality experienced by the operator can be improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a vehicle including an engine, the vehicle at standstill, comprising:
   during a first engine idling condition, shutting down the engine in response to the vehicle being located in an enclosed parking lot; and
   during a second engine idling condition, delaying the engine shutdown in response to the vehicle being located in an open space, the delay adjusted based on an ambient humidity of the open space and an operator proximity to the vehicle being greater than a threshold.

2. The method of claim 1, wherein the delaying is further responsive to a change in a commanded air-to-fuel ratio being higher than a threshold.

3. The method of claim 1, wherein the adjustment includes increasing the delay as the ambient temperature of the open space falls below a threshold temperature.

4. The method of claim 1, wherein the vehicle being located in the enclosed space or the open space is based on input from one or more of a temperature sensor and a humidity sensor.

5. The method of claim 1, wherein during each of the first and second engine idling conditions, the vehicle is parked and optionally unoccupied.

6. The method of claim 1, wherein during the first condition, the vehicle is parked in an indoor parking location, and wherein during the second condition, the vehicle is parked in an outdoor parking location.

7. A vehicle system, comprising:
   an engine;
   an operator ignition interface for initiating and terminating operation of the engine;
   a passive key communicatively coupled to the operator ignition interface and configured to initiate and/or terminate operation of the engine based on operator input;
   a temperature sensor located on an exterior surface of the vehicle and configured to estimate an ambient temperature;
   an ambient humidity sensor;
   a navigation system including one or more location sensors configured to estimate a location of the vehicle; and
   an engine controller with computer readable instructions for:
   extending an idle time before an automatic shutdown of an idling engine based on the ambient temperature estimated over a duration of the standstill and ambient humidity in response to an operator proximity to the vehicle being greater than a threshold.

8. The system of claim 7, wherein the extending includes extending the idle time as the estimated ambient temperature falls below a threshold temperature.

9. The system of claim 7, wherein the controller includes further instructions for not extending the idle time when the vehicle is at standstill with the engine idling and the operator proximity is lower than the threshold.

10. The system of claim 7, wherein the vehicle is unoccupied by the operator over the duration of the standstill.

* * * * *